(12) United States Patent
Jung

(10) Patent No.: US 12,017,160 B2
(45) Date of Patent: Jun. 25, 2024

(54) WATER PURIFICATION HOUSING AND RAINWATER PURIFICATION SYSTEM USING THE SAME

(71) Applicant: Kwan Jung, Daegu (KR)

(72) Inventor: Kwan Jung, Daegu (KR)

( * ) Notice: Subject to any disclaimer, the term of this patent is extended or adjusted under 35 U.S.C. 154(b) by 100 days.

(21) Appl. No.: 17/825,174

(22) Filed: May 26, 2022

(65) Prior Publication Data
US 2022/0387909 A1  Dec. 8, 2022

(30) Foreign Application Priority Data

Jun. 7, 2021 (KR) ........................ 10-2021-0073443

(51) Int. Cl.
*B01D 24/16* (2006.01)
*B01D 24/00* (2006.01)
(Continued)

(52) U.S. Cl.
CPC ......... *B01D 24/165* (2013.01); *B01D 24/007* (2013.01); *B01D 24/008* (2013.01); *B01D 24/44* (2013.01); *B01D 24/4621* (2013.01); *B01D 36/02* (2013.01); *C02F 1/001* (2013.01); *C02F 1/32* (2013.01); *C02F 9/00* (2013.01); *B01D 2221/12* (2013.01); *C02F 1/283* (2013.01); *C02F 1/325* (2013.01); *C02F 2103/001* (2013.01); *C02F 2201/002* (2013.01); *C02F 2303/04* (2013.01)

(58) Field of Classification Search
CPC .. B01D 24/165; B01D 24/007; B01D 24/008; B01D 24/44; B01D 24/4621; B01D 36/02; B01D 2221/12; B01D 24/004; B01D 36/04; C02F 1/001; C02F 1/32; C02F 1/283; C02F 1/325; C02F 1/281; C02F 1/286; C02F 1/68; C02F 2103/001; C02F 2201/002; C02F 2303/04; C02F 9/00

See application file for complete search history.

(56) References Cited

U.S. PATENT DOCUMENTS

| 62,582 | A | * | 3/1867 | Whitehill | ............. | B01D 24/165 210/283 |
| 138,466 | A | * | 5/1873 | Ball | ...................... | B01D 24/48 210/313 |
| 5,026,477 | A | * | 6/1991 | Yen | ......................... | C02F 1/325 210/169 |

FOREIGN PATENT DOCUMENTS

| FR | 320447 | * | 4/1902 |
| JP | H06-277407 A | | 10/1994 |

(Continued)

*Primary Examiner* — Liam Royce
(74) *Attorney, Agent, or Firm* — KORUS Patent, LLC; Seong Il Jeong

(57) ABSTRACT

A water purification housing capable of purifying water and a rainwater purification system using the water purification housing are provided. The water purification housing filters treated water by filling filter media in a housing body and then passing the treated water through the filter media and removes residue caught in the filter media as a result of the use of the filter media by collecting the residue in a sediment discharge container positioned at a bottom portion of the housing body. The rainwater purification system includes an element that connects and installs several water purification housings and an additional filtration element including fiber filter and UV lamp which can filter materials that cannot be filtered only by the filter media at the end of the rainwater purification system.

2 Claims, 7 Drawing Sheets

(51) Int. Cl.
  *B01D 24/44*  (2006.01)
  *B01D 24/46*  (2006.01)
  *B01D 36/02*  (2006.01)
  *C02F 1/00*   (2023.01)
  *C02F 1/28*   (2023.01)
  *C02F 1/32*   (2023.01)
  *C02F 9/00*   (2023.01)
  *C02F 103/00* (2006.01)

(56) References Cited

FOREIGN PATENT DOCUMENTS

| KR | 10-2004-0035625 A | 4/2004 |
| KR | 10-2004-0098854 A | 6/2006 |
| KR | 10-2016-0050578 A | 5/2016 |
| KR | 10-2187983 B1 | 12/2020 |
| KR | 10-2202862 B1 | 1/2021 |
| KR | 10-2216793 B1 | 2/2021 |
| KR | 10-2219449 B1 | 2/2021 |

* cited by examiner

WATER PURIFICATION HOUSING AND RAINWATER PURIFICATION SYSTEM USING THE SAME

FIELD OF THE INVENTION

The present invention relates to a water purification housing capable of purifying water and a rainwater purification system using the same.

BACKGROUND OF THE INVENTION

These days, not only Korea but also the world is facing water shortage, and it has been researched that approximately 20% of the world's population, approximately 1.1 billion people, do not have access clean water.

Although clean water can be easily used in countries with developed water treatment facilities, such as Korea, in underdeveloped countries such as Southeast Asia, Africa, and India, and China and Vietnam with many flooded areas, where water is scarce and water treatment facilities are not developed, people cannot drink clean water and are suffering from various diseases.

People in Korea who live in villages and households in mountainous areas or remote places which are far away from cities and are difficult to supply water sources, also uses mineral water. However, there is a risk of drinking water contaminated with mineral such as heavy metals.

In addition, in the case of food factories, breeding facilities, or densely populated buildings such as an apartment, a government office, a school, a dormitory, and other facilities such as an office, where the supply of tap water is sufficient, but water consumption is high, there is a problem in that water costs are high if tap water is used as living water.

Meanwhile, groundwater can be used instead of mineral water or tap water for various types of living water, but in the case of mountainous areas, there are big problems in that it is difficult to move a drilling machine, construction cost is high, and groundwater may be contaminated due to reckless development of groundwater.

For reference, the following prior art documents are four recent prior art documents, which has been searched with a keyword "rainwater purification" through the patent information mesh KIPRIS, Korea Intellectual Property Rights Information Service, and the technical field, background, and development related to the present invention can be grasped with reference to the following prior art documents.

PRIOR ART DOCUMENTS

Patent Documents (Patent Document 0001) Korean Patent Registration Publication 1022194490000
(Patent Document 0002) Korean Patent Registration Publication 1021879830000
(Patent Document 0003) Korean Patent Registration Publication 1022028620000
(Patent Document 0004) Korean Patent Registration Publication 102167930000

DETAILED DESCRIPTION OF THE INVENTION

Technical Problems

The present invention has been developed to solve the conventional problems mentioned in the background of the invention, and in particular, an object of the present invention is to provide a water purification housing and a rainwater purification system using the same that can solve water shortage and be free from risks of various polluted mineral water or groundwater, by storing rainwater and then purifying it to use it as living water or drinking water when it is difficult to supply tap water or the cost of tap water is burdensome.

SUMMARY OF THE INVENTION

As a means for solving the problems, the present invention suggests a water purification housing provided with a means that can filter treated water by filling filter media in a housing body and then passing the treated water through the filter media and a means that can remove residue caught in the filter media as a result of use of the filter media by collecting the residue in a sediment discharge container positioned at a bottom portion of the housing body.

In addition, the present invention suggests a rainwater purification system comprising a means that connects and installs several water purification housings and an additional filtration means, including a fiber filter and a UV lamp, at the end thereof, which can filter materials that cannot be filtered only by the filter media.

TECHNICAL EFFECTS OF THE INVENTION

The water purification housing according to the means of the present invention can filter treated water by passing it through filter media, and in particular, can remove residue by precipitation of the residue in the filter media, thereby allowing the filter media to be used without replacing it.

In addition, the rainwater purification system according to the means of the present invention can purify rainwater to a high degree by connecting and installing a plurality of water purification housings and can sterilize water as well as improve water quality by equipping with the additional filtration means, including the fiber filter and the UV lamp, which can filter materials that cannot be filtered only by the filter media.

Accordingly, if the supply of tap water is difficult or the use of tap water is burdensome, a user can store rainwater and purify it using the water purification housing and the rainwater purification system using the same according to the present invention to use purified water as living water or drinking water. Thus, the present invention can solve domestic and international water shortages and be free from side effects caused by the use of various polluted mineral water or groundwater.

Modes for the Invention

Figure 1:
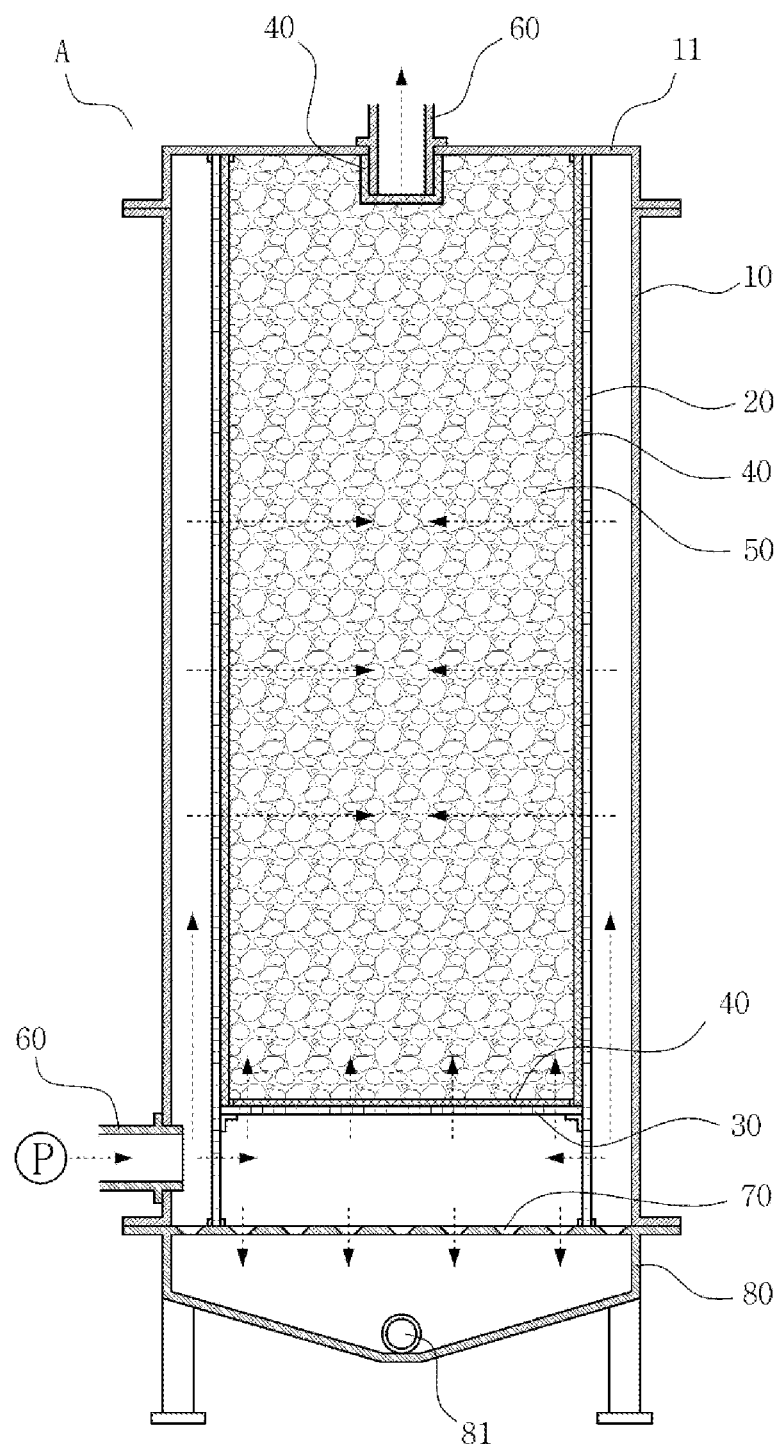
FIG. 1 is an exemplary drawing illustrating a water purification housing according to an embodiment of the present invention.

Hereinafter, the present invention will be described in detail with reference to the accompanying drawings. However, the accompanying drawings may be exaggerated, omitted, or schematically shown for the convenience of explanation regarding main components, and terms and names used in description are implicitly defined by various elements such as a shape, an action, and a role of a configuration rather than meanings in dictionary. Description of directions is determined based on first presented directions on the first presented drawing, and description of positions is determined based on a center or middle of each configuration or a center of a circle. In addition, since detailed description of registered, known technologies and conventional technologies may obscure the gist of the present invention, it is omitted or replaced with simple symbols or names. In addition, a specific structure, a shape, a form, an arrangement, a size of a configuration that can be identified through the drawings, an operation of the configuration that can be inferred through the drawings, and an effect thereof may also obscure the gist of the present invention, detailed description thereof will be omitted. Furthermore, since components, such as a bolt, a welding area, and a hole, which are applied for coupling between components may obscure the gist of the present invention, they may be omitted from the drawing. Unless a shape of a configuration is specifically specified, the shape in an upper view is a circle or a rectangle, and in this case, the upper view may be omitted.

Hereinafter, the present invention will be described with reference to FIG. 1 as follows.

As shown in drawings, a water purification housing A according to the present invention comprises a means that can filter treated water by filling filter media 50 inside a housing body 10 and then passing the treated water through the filter media 50 and a means that can remove residue caught in the filter media 50 as a result of use of the filter media 50 by collecting the residue in a sediment discharge container 80 positioned at a bottom portion of the housing body 10.

More specifically,

The water purification housing A of FIG. 1 comprises: a cylindrical housing body 10 having a lid 11 on an upper end thereof; a cylindrical vertical perforated mesh 20 that is installed to be spaced apart from an inner circumferential wall of the housing body 10 to have a space inward; a disk-shaped horizontal perforated mesh 30 that is installed to be spaced apart from an inner bottom of the vertical perforated mesh 20 to have a space upward; a fine wire mesh 40 that is installed to be in close contact with an inner surface of the vertical perforated mesh 20 and an upper surface of the horizontal perforated mesh 30; filter media 50 filled inside a filtration space between an inner portion of the fine wire mesh 40 of the vertical perforated mesh 20 and an upper portion of the fine wire mesh 40 of the horizontal perforated mesh 30; a connection pipe 60 installed at one side of a lower portion of the housing body 10 and a center of an upper end of the lid 11; a precipitation hole 70 positioned in a bottom of the housing body 10 and formed to have a wide upper portion and a lower narrow portion; a sediment discharge container 80 installed to be connected to a bottom of the housing body 10 so as to have a sediment collection space downward from a bottom of the precipitation hole 70, and a sediment outlet 81 installed on one side of a bottom of the sediment discharge container 80.

As shown in the drawings, the water purification housing A uses the connection pipe 60 of the housing body 10 as an inlet and uses the connection pipe 60 of the lid 11 as an outlet. In this case, the water purification housing A can purify treated water in such a way that water put into the inlet passes the filter media 50 through a circumference of the outer space of the vertical perforated mesh and is discharged to the outlet and at the same time passes the inner filter media 50 through the lower space of the horizontal perforated mesh 30 and is discharged to the outlet.

Although not shown, as opposed to the above, the water purification housing A may use the connection pipe 60 of the lid 11 as an inlet and the lower connection pipe 60 of the housing body 10 as an outlet. In this case, the water purification housing A can purify treated water in such a way that water put into the inlet passes the filter media 50 and is discharged to the outlet through the circumference of the outer space of the vertical perforated mesh 20 and at the same time is discharged to the outlet through the lower space of the horizontal perforated mesh 30 and the outer space of the vertical perforated mesh 20.

That is, the water purification housing A may be used in a way that the treated water is discharged upstream or may be used in a way that the treated water is discharged downstream.

Hereinafter, the present invention will be explained with an embodiment where the connection pipe 60 of the housing body 10 is used as an inlet, and the connection pipe 60 of the lid 11 is used as an outlet.

The water purification housing A purifies treated water in such a way that water put into the inlet passes the filter media 50 through the circumference of the outer space of the vertical perforated mesh and is discharged to the outlet and at the same time passes the filter media 50 through the lower space of the horizontal perforated mesh 30 and is discharged to the outlet.

That is, the water purification housing A is operated in such a way that the treated water is discharged by flowing into a lower portion of the inside of the housing body 10 and rising to an upper end of the center of the housing body 10.

In the above, the filter media 50 may be filled with natural minerals or artificial filter media such as gravel, sand, loess balls, activated carbon, charcoal, elvan, zeolite, chitosan, quartz, and the like, and a size of the filter media 50 may be reduced as its location goes to from the lower portion to the upper portion.

In a process where the treated water is introduced and discharged through the filter media 50, foreign substances contained in the treated water are filtered, and the treated water is purified to clean water, while passing through the filter media 50.

In the above, the perforated meshes 20, 30 perform functions of filtering relatively large foreign substances, dividing the space, and supporting. The fine wire mesh 40 performs functions of filtering relatively small foreign substances and preventing small-sized filter media 50 from escaping. The filter media 50 performs a function of filtering fine foreign substances.

As shown in the drawings, the outlet of the lid 11 may be covered with the perforated mesh 20 and the fine wire mesh 40 at the inlet of the connection pipe 60 so that the filter media 50 does not escape.

In a normal state, a valve V of the sediment outlet 81 of the sediment discharge container 80 is maintained in a closed state, and when performing a filtration process of the treated water or a precipitation process in which the filtration process stops in a state where the treated water is filled inside of the water purification housing A, residue caught on the filter media is naturally precipitated and collected. Then, the sediment collected in this way is discharged by opening the valve V of the sediment outlet 81, and thus the filter media 50 can be continuously used without replacing it.

In the above, the precipitation hole 70 having a wide upper portion and a lower narrow portion enables sediment to be easily collected and prevents the sediment from floating and rising to the outside of the sediment discharge container 80 by water flow of the sediment collected in the sediment discharge container 80 during the filtration process of the treated water.

Accordingly, since the treated water can be easily filtered using the filter media 50 and the residue of the filter media 50 can be precipitated and discharged, water purification treatment can be performed without replacing the filter media 50.

Hereinafter, the present invention will be described with reference to FIG. 2.

Figure 2:
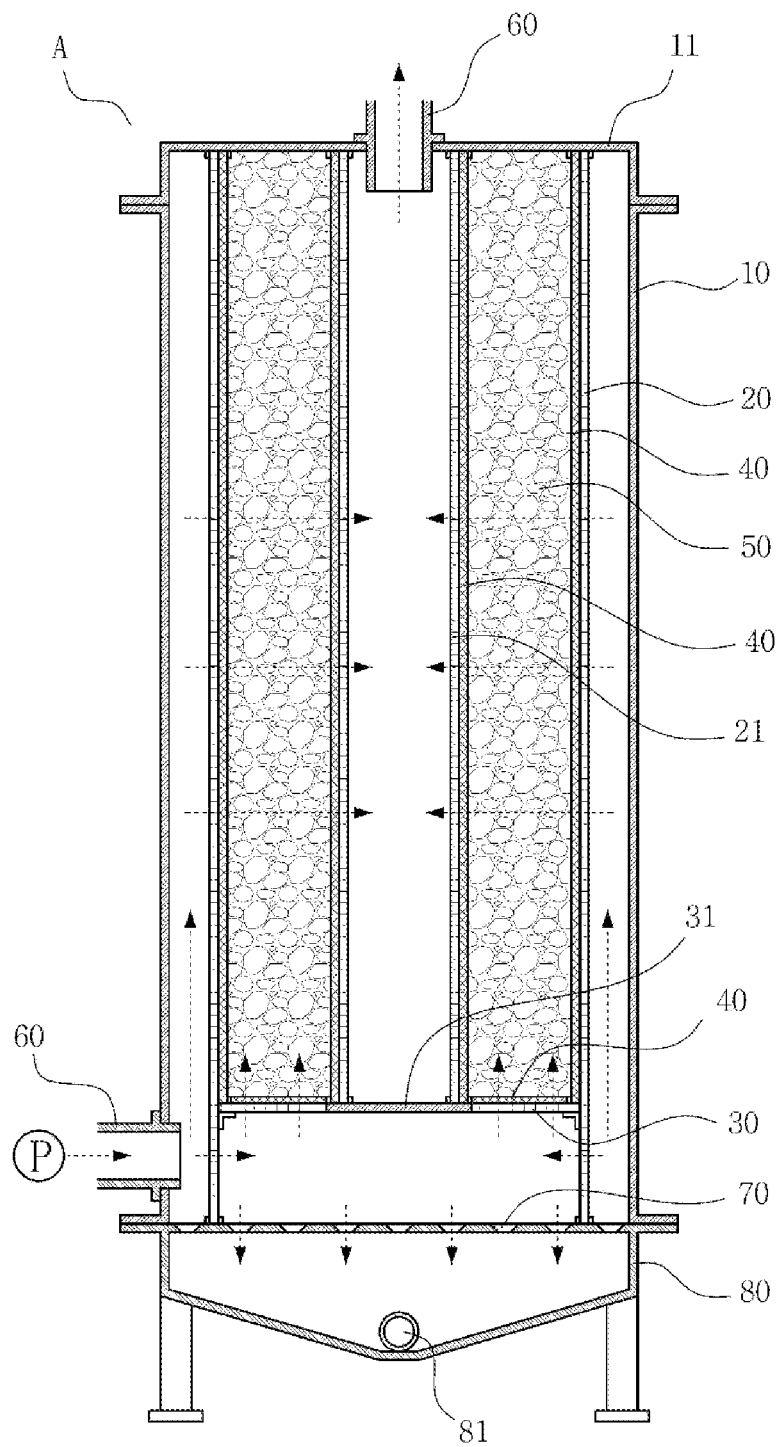
FIGS. 2 to 5 are other exemplary drawings of FIG. 1.

Based on the water purification housing A of FIG. 1, the water purification housing A of FIG. 2 may further comprise: a cylindrical inner vertical perforated mesh 21 that is installed to be spaced apart from an inner surface of the vertical perforated mesh 20 so as to have a space in a center of an upper surface of the horizontal perforated mesh 30 within the vertical perforated mesh 20; a fine wire mesh 40 installed so as to be in close contact with an outer surface of the inner vertical perforated mesh 21; a shielding part 31 of the horizontal perforated mesh 30 formed to block a lower end of the inner vertical perforated mesh 21, and filter media 50 filled inside a filtration space between an inner portion of the fine wire mesh 40 of the vertical perforated mesh 20 and an outer portion of the fine wire mesh 40 of the inner vertical perforated mesh 21.

Accordingly, since the water purification housing A of FIG. 2 can secure a hollow space inside, filtration speed of the treated water can be improved than that of the water purification housing A of FIG. 1.

Hereinafter, the present invention will be described with reference to FIG. 3.

Figure 3:
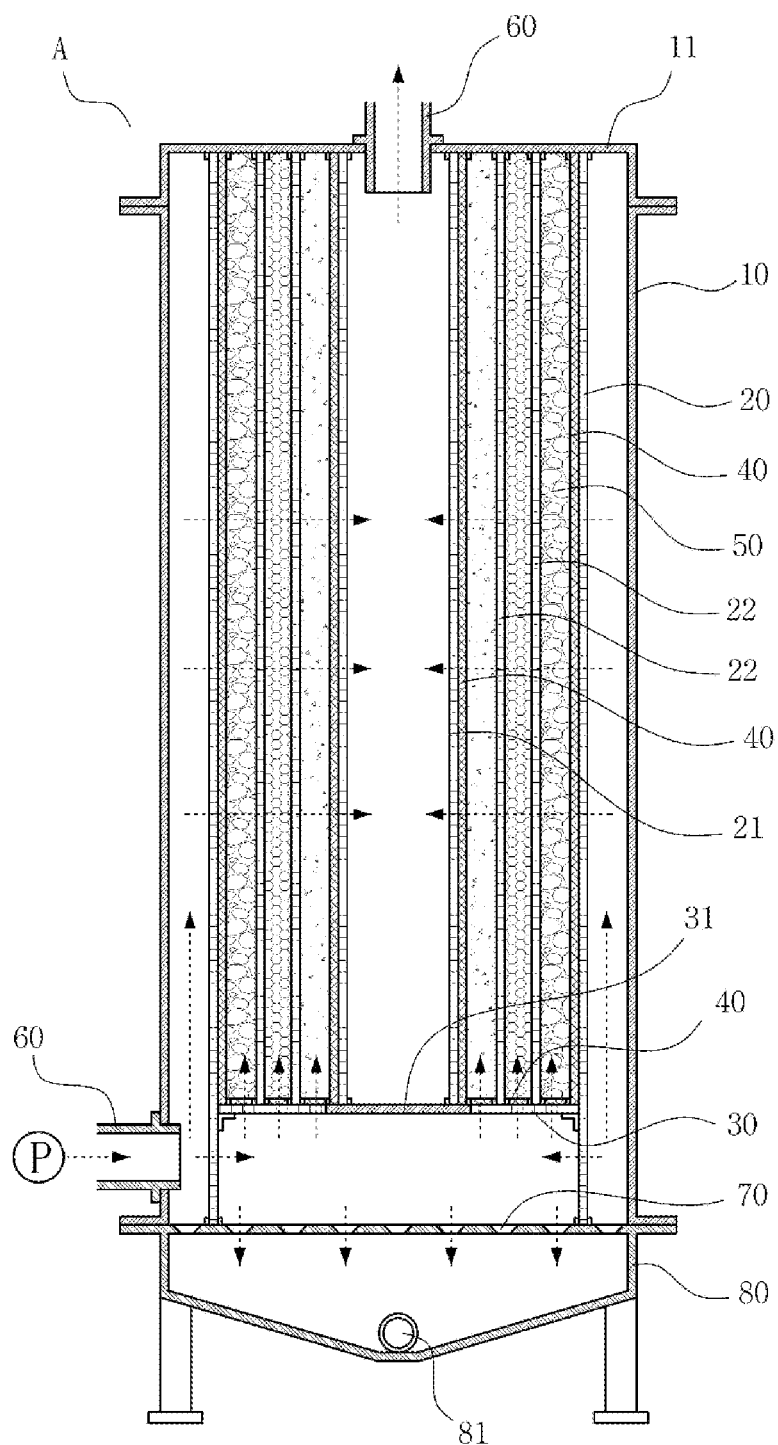

Based on the water purification housing A of FIG. 2, the water purification housing A of FIG. 3 may further comprise: one or more intermediate vertical perforated meshes 22 installed between the vertical perforated mesh 20 and the inner vertical perforated mesh 21 and filter media 50 heterogeneously filled inside filtration spaces between the inner portion of the fine wire mesh 40 of the vertical perforated mesh 20 and one or more of the intermediate vertical perforated meshes 22, between the intermediate vertical perforated meshes 22, and between the outer portion of the fine wire mesh 40 of the inner vertical perforated mesh 21 and one or more of the intermediate vertical perforated meshes 22.

Accordingly, since the water purification housing A of FIG. 3 enables the treated water to sequentially passes through different types or different sizes of filter media 50 in the passing passage, filtration ability can be improved than that of the water purification housing A of FIG. 2.

Hereinafter, the present invention will be described with reference to FIG. 4.

Figure 4:
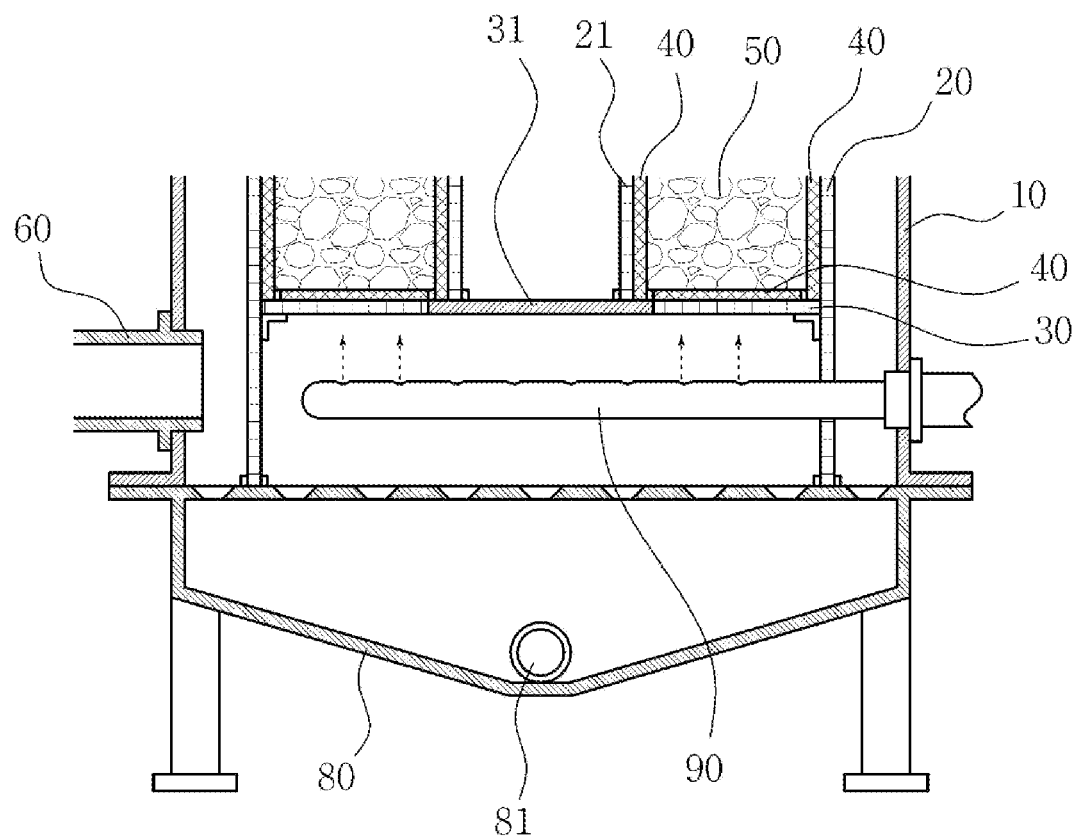

Referring to FIG. 4, the water purification housing A of FIG. 4 may further comprise a bubble supply nozzle 90 installed so as to penetrate through the vertical perforated mesh 20 from a lower portion of the housing body 10 and to be located in a space of a lower portion of the horizontal perforated mesh 30.

The bubble supply nozzle 90 is connected to a compressor from the outside and can be supplied with bubbles.

Accordingly, since the water purification housing A of FIG. 4 can supply bubbles to the treated water, quality of the treated water can be improved, and when the residue is precipitated, the residue caught in the filter media 50 can be easily separated from the filter media 50, thereby improving precipitation efficiency.

Hereinafter, the present invention will be described with reference to FIG. 5.

Figure 5:
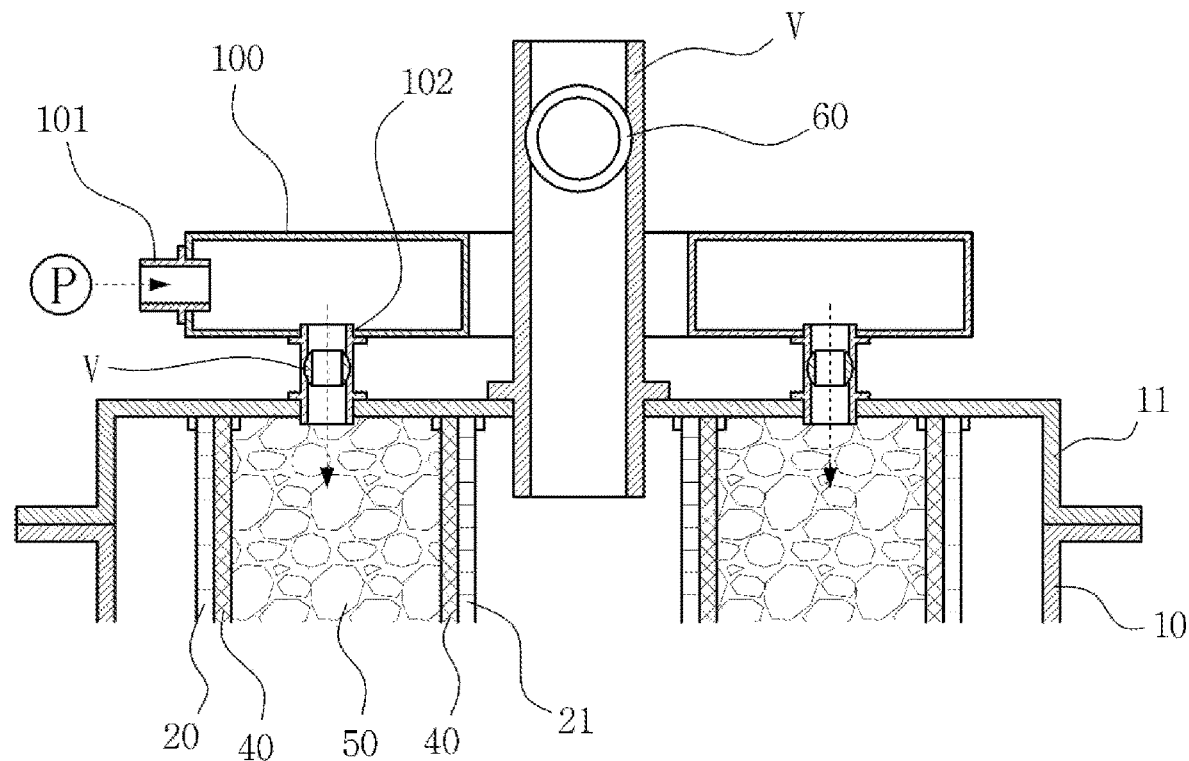

Referring to FIG. 5, the water purification housing A of FIG. 5 may further comprise a sediment discharge forcing means including: a cylindrical pressurizing box 100 having an inlet pipe 101 installed on an upper end of the lid 11 of the housing body 10, and one or more pressurizing pipes 102 installed to be connected to an inner upper end of the housing body 10 from an inner lower portion of the pressurizing housing 100 along a central circumference of the pressurizing housing 100.

The sediment discharge forcing means may maintain a valve V of the pressure pipe 102 in a closed state during the normal filtration process and open the valve V of the pressure pipe 102 when a precipitation means is required during the filtration process or during the precipitation process and pressurize the filter media 50 inside the water purification housing A with water supplied through the inlet pipe 101 of the water purification housing A.

Accordingly, since the water purification housing A of FIG. 5 can forcibly precipitate the residue by water pressure without relying on natural precipitation during the precipitation process of the water purification housing A, the residue caught in the filter media 50 is easily separated, and the precipitation process can be completed quickly.

Figure 6:
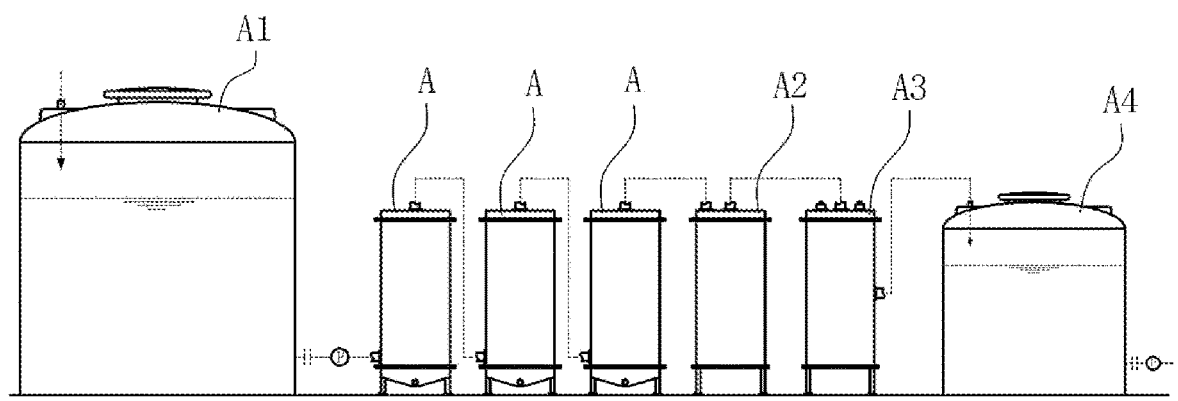
FIG. 6 is an exemplary drawing illustrating a rainwater system according to an embodiment of the present invention.

Hereinafter, the present invention will be described with reference to FIG. 6.

The rainwater purification system using the water purification housing A described above comprises: a water collecting tank A1 that collects water to be treated; one or more of the above described water purification housings A installed to be connected to outlets of the water collecting tank A1; a fiber filter housing A2 connected to an outlet of the water purification housing A positioned at the end, and a UV lamp housing A3 installed to be connected to a rear portion of the fiber filter housing A2.

In the above, it is desired that at least three water purification housing A are sequentially connected to each other as shown in the drawings. In this case, the first water purification housing A may be configured to be a pre-treatment housing that filters relatively large foreign substances by mixing gravel, sand, and the like, the second water purification housing A may be configured to be an intermediate treatment housing that filters fine foreign substances by mixing loess balls, activated carbon, charcoal, and the like, and the third water purification housing A may be configured to be a post-treatment housing that improves water quality by mixing elvan, zeolite, chitosan, quartz, and the like.

In this way, the treated water can be filtered clean enough to be used as drinking water.

The number of the water purification housing A in the above may increase or decrease according to quality of water to be treated. For example, when quality of treated water is of a first grade, all of the above described filter media 50 may be filled in a single water purification housing A, and when quality of treated water is of a fourth grade, four or more of the above described purified housings A may be used.

In the above, the fiber filter housing A2 is provided with a microfiber filter A21 inside and can highly filter fine foreign substances that cannot be filtered by the filter media 50 enough to be used as drinking water. The UV lamp housing A3 is provided with a UV lamp A31 inside can highly improve water quality of treated water that cannot be treated in the filter media 50 by sterilizing and disinfecting the treated water.

The rainwater purification system may be operated with divided operations: a water purification process for a certain period of time and a precipitation process in which the residue in the filter media 50 is precipitated for a certain period of time. The rainwater purification system may be provided with a treated water storage tank A4 and be operated so that the purified treated water is used by using a pump when living water is needed.

Meanwhile, it is desired that the rainwater purification system according to the present invention is used to purify rainwater as a target material, but the present invention is not limited thereto. That is, the rainwater purification system of the present invention can be used to purify mountain water, river water, groundwater, and the like and produce living water or drinking.

Figure 7:
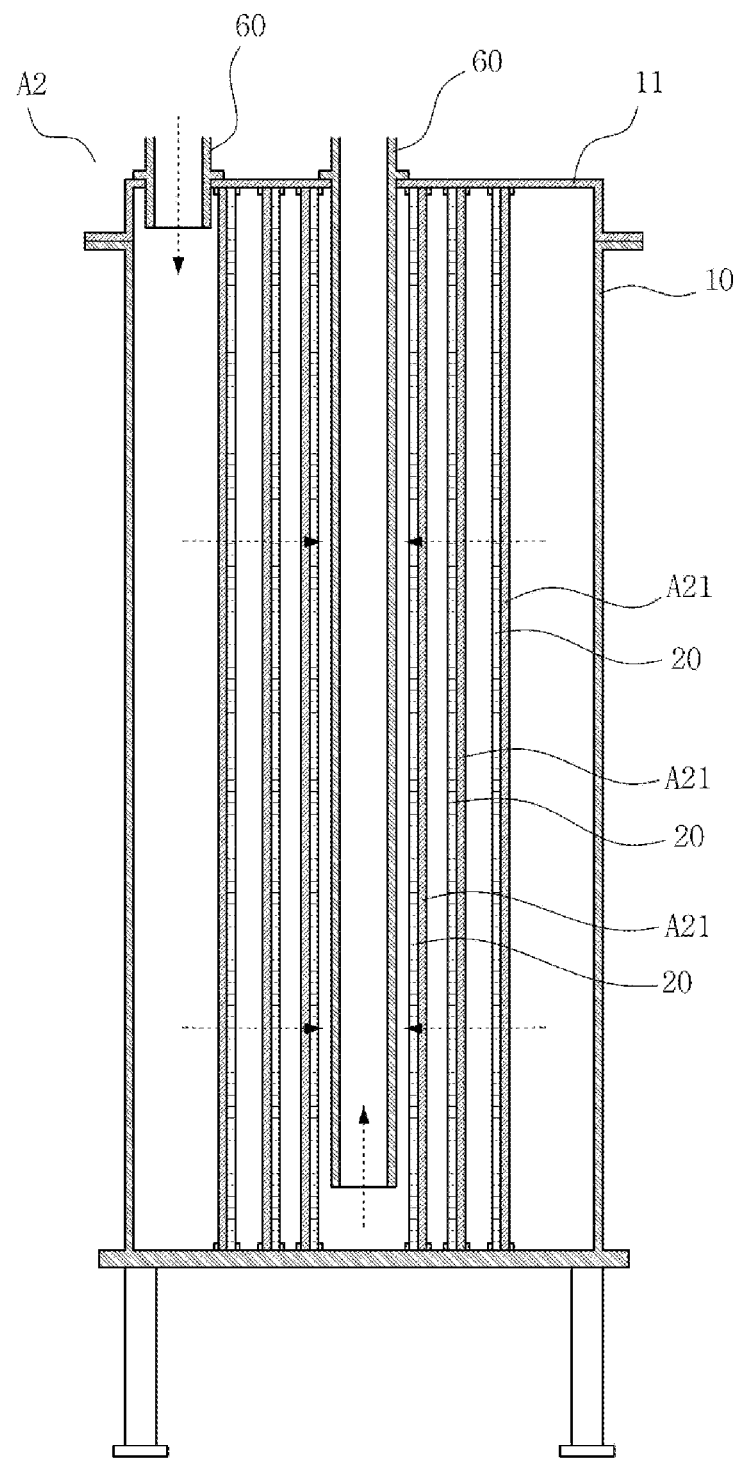
FIG. 7 is an exemplary drawing illustrating a fiber filter housing that can be applied to FIG. 6.

Hereinafter, the present invention will be described with reference to FIG. 7.

As shown, the fiber filter housing A2 applied to the rainwater purification system may be configured to delete the filter media 50 and the sediment discharge means from the configurations of the water purification housing A, to include: a vertical perforated mesh 20 that is installed to have spaces inside each of which is spaced apart from a center and is sequentially expanded and a fiber filter A21 that is installed to be in close contact with the vertical perforated mesh 20, and to be configured with a connection pipe 60 formed on one side of an upper end of the lid 11 as an inlet and the connection pipe 60 positioned at the center as an outlet.

In this way, the fiber filter housing A2 enables the treated water to be filtered from an outer circumference to an inner circumference and then to be collected and discharged in the central space. Accordingly, the fiber filter housing A2 can significantly improve a filtration ability by allowing the treated water to pass the fiber filters A21 in multiple stages during the filtration process. In addition, installation and replacement of the fiber filter A21 is easy, and the fiber filter housing A2 can be easily manufactured.

In the above, the fiber filter A21 may have a narrower space as positioned from the outer portion to the inner portion.

Figure 8:
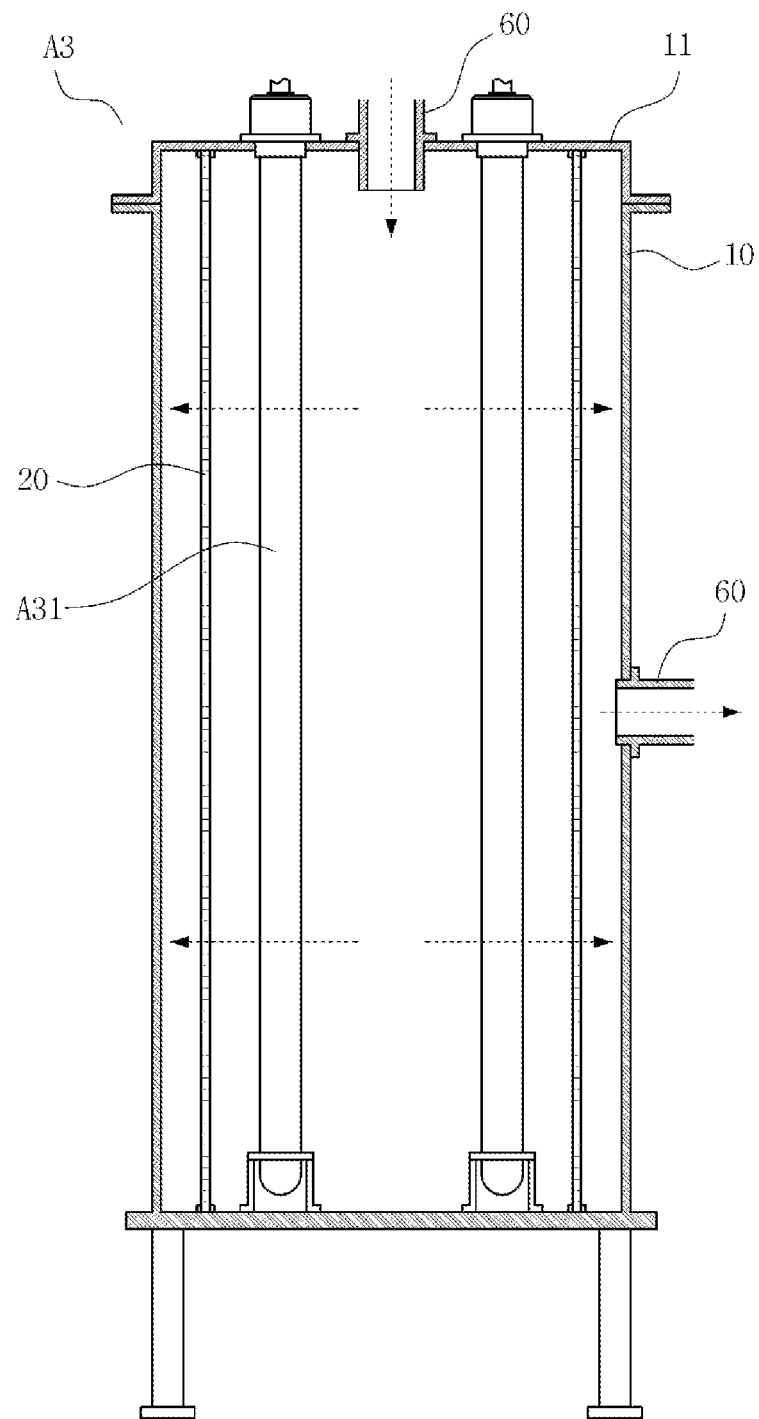
FIG. 8 is an exemplary drawing illustrating a UV lamp housing that can be applied to FIG. 7.

Hereinafter, the present invention will be described with reference to FIG. 8.

As shown, the UV lamp housing A3 applied to the rainwater purification system may be configured to include: a vertical perforated mesh 20 formed on an outer portion of the inside of the configurations of the fiber filter housing A2, and one or more UV lamps A31 installed inside the vertical perforated mesh 20 to be extended from the lid 11.

In this way, the UV lamp housing A3 enables the treated water to be collected and discharged from the inner center to the outer circumference through the UV lamp A31. Since the treated water is slowly discharged during a moving process by the vertical perforated mesh 20 and is irradiated with light of the UV lamp A31, sterilization and disinfection treatment of the treated water can be done uniformly and evenly. In addition, installation and replacement of the UV lamp A31 is easy, and the UV lamp housing A3 can be easily manufactured.

As described above, the present invention has been explained. In order to explain the principle of configurations of the present invention and assist the understanding of the principle of the configurations of the present invention, the configurations of the present invention and specific components included in the configurations are illustrated in the drawings and described based on the drawings. The structure, form, shape, arrangement, direction, and quantity of the configuration included in the present invention and its specific components are determined in consideration of the principle to be pursued and can be variously changed as needed. The configuration and specific components thereof presented in the present invention are illustrative of the most desired embodiment as a principle applied to the present invention to obtain effects and better effects by those of ordinary skill in the art. Accordingly, it is most desired that the present invention includes all of the components described above, but some of the components described above may be selected or excluded for cost reduction, manufacturing convenience, environmental conditions or necessity, and one or some components may be separately selected and combined with other components. In addition, each of the above components may be independently applied to other technical fields other than this technical field in consideration of a principle, a use, a function, a role, an action, an effect, and others. Based on this, scopes of the present invention are claimed in order from a claim with a broad scope as shown in the accompanying drawings. Through this, those skilled in the art can sufficiently grasp the gist to be pursued in the present invention through the above detailed description and the claims to be described below. In addition, an effect of a component that is illustrated in the drawings but not described will be sufficiently inferred through the drawings. Those skilled in the art will be able to embody various modifications and changes based on the description mentioned in the present invention, thereby further increasing development and efficiency of use in this technical field.

What is claimed is:

1. A water purification housing for filtering water comprising:
   a cylindrical housing body having a lid on an upper end thereof;
   a cylindrical vertical perforated mesh installed spaced apart from an inner circumferential wall of the housing body to have a space inward;
   a disk-shaped horizontal perforated mesh installed spaced apart from an inner bottom of the vertical perforated mesh to have a space upward;
   a fine wire mesh installed in contact with an inner surface of the vertical perforated mesh and an upper surface of the horizontal perforated mesh;
   filter media filled inside a filtration space between an inner portion of the fine wire mesh of the vertical perforated mesh and an upper portion of the fine wire mesh of the horizontal perforated mesh;
   a connection pipe installed at one side of a lower portion of the housing body and a center of an upper end of the lid;
   a precipitation hole positioned in a bottom of the housing body and formed to have a wide upper portion and a lower narrow portion;
   a sediment discharge container connected to a bottom of the housing body so as to have a sediment collection space downward from a bottom of the precipitation hole; and
   a sediment outlet installed on one side of a bottom of the sediment discharge container,
   wherein the water purification housing optionally further comprises:
   a cylindrical inner vertical perforated mesh installed spaced apart from an inner surface of the vertical perforated mesh so as to have a space in a center of an upper surface of the horizontal perforated mesh within the vertical perforated mesh;

a fine wire mesh installed in contact with an outer surface of the inner vertical perforated mesh;

a shielding part of the horizontal perforated mesh formed to block a lower end of the inner vertical perforated mesh; and filter media filled inside a filtration space between an inner portion of the fine wire mesh of the vertical perforated mesh and an outer portion of the fine wire mesh of the inner vertical perforated mesh, wherein the water purification housing optionally further comprises:

one or more intermediate vertical perforated meshes installed between the vertical perforated mesh and the inner vertical perforated mesh; and filter media filled inside filtration spaces between the inner portion of the fine wire mesh of the vertical perforated mesh and one or more of the intermediate vertical perforated meshes, between the intermediate vertical perforated meshes, and between the outer portion of the fine wire mesh of the inner vertical perforated mesh and one or more of the intermediate vertical perforated meshes, wherein the water purification housing optionally further comprises a bubble supply nozzle installed so as to penetrate through the vertical perforated mesh from a lower portion of the housing body and located in a space of a lower portion of the horizontal perforated mesh, wherein the water purification housing optionally further comprises:

a sediment discharge forcing means including: a cylindrical pressurizing box having an inlet pipe installed on an upper end of the lid of the housing body; and one or more pressurizing pipes connected to an inner upper end of the housing body from an inner lower portion of the pressurizing housing along a central circumference of the pressurizing housing.

2. A rainwater purification system comprising:

a water collecting tank that collects water to be treated;

one or more of the water purification housings of claim 1 each of which is connected to an outlet of the water collecting tank;

a fiber filter housing connected to an outlet of the water purification housing positioned at the end; and a UV lamp housing connected to a rear portion of the fiber filter housing.

* * * * *